United States Patent
Backus

[11] 3,895,120
[45] July 15, 1975

[54] METHOD OF PREPARING A DRESSED, RAW FOWL CARCASS TO BE COOKED

[76] Inventor: Harry A. Backus, 370 Neeb Rd., Cincinnati, Ohio 45238

[22] Filed: May 10, 1974

[21] Appl. No.: 469,002

[52] U.S. Cl. ............... 426/396; 426/129; 426/513; 426/518
[51] Int. Cl.² ........................................ B65B 29/08
[58] Field of Search ............ 426/92, 104, 106, 113, 426/129, 224, 382, 392, 394, 396, 414, 513, 518, 523; 17/1 R, 23, 52

[56] References Cited
UNITED STATES PATENTS

| | | | |
|---|---|---|---|
| 2,480,082 | 8/1949 | Lowry et al. | 426/393 |
| 2,853,389 | 9/1958 | Luchese | 426/513 X |
| 3,594,189 | 7/1971 | Panattoni | 426/92 |
| 3,780,196 | 12/1973 | Domecki | 426/414 X |

*Primary Examiner*—Frank W. Lutter
*Assistant Examiner*—Steven L. Weinstein
*Attorney, Agent, or Firm*—Walter S. Murray

[57] ABSTRACT

A method of preparing a dressed, raw fowl carcass to be baked in a pan. The dressed carcass is severed lengthwise completely through the back bone region and then flattened by spreading apart the severed back portions of the carcass. The flattened carcass is placed upon a bed of stuffing in a pan having a continuous side wall, the flattened carcass being molded and shaped by the side wall whereby the wings and legs of the carcass are positioned above the carcass breast portions. The pan and contents are enclosed in a transparent envelope to provide a sales and/or baking package.

2 Claims, 2 Drawing Figures

METHOD OF PREPARING A DRESSED, RAW FOWL CARCASS TO BE COOKED

This invention relates to a novel method of preparing a dressed, raw fowl and particularly resides in the method of butchering a raw dressed fowl carcass and the unique manner in which said fowl carcass is associated with a bed of stuffing within a cooking container for baking purposes.

Specifically my invention is directed to the provision of a better means of baking a raw fowl and its associated stuffing which includes the steps of severing the carcass of a dressed fowl lengthwise completely through the backbone region, spreading the severed back regions of the carcass apart to place the entire carcass in a flattened condition with the wings and legs of the carcass positioned over the breast region, placing a bed of stuffing in a pan, and depositing the flattened carcass of the fowl upon the bed of stuffing, breast side up. Ideally the pan has a flat bottom wall and an upstanding side wall dimensioned to snuggly receive the sides of the flattened fowl carcass to thereby mold and shape it and thereafter maintain the legs and wings of the carcass in position above the breast region of the carcass for baking purposes.

An object of the invention is to provide a specially butchered and flattened raw fowl carcass and underlying stuffing that are uniquely disposed in a baking pan, whereby during the baking process, juices exuded from the fowl carcass drop upon and flavor the stuffing instead of being evaporated and wasted as is the case with the conventional baking of a stuffed fowl "in the round" where the juices of the fowl drop into the baking pan and are for the most part evaporated.

Another object of this invention is to provide a prepared raw fowl and stuffing wherein the stuffing has ample room for expansion during cooking and after cooking provides easy access to the stuffing and presents a more appetizing way of serving stuffing as compared with the present manner of serving stuffing through the back, underside opening in a baked fowl's carcass.

Other objects of the invention are to provide a raw, butchered fowl and stuffing so placed in a relatively shallow, round metal baking pan that during cooking the wings and legs become well browned because they protrude above the breast portion of the fowl, the dripping exuded therefrom falling directly on the breast to self-baste the breast portion, said wings and legs also covering and protecting the breast portion to keep it from drying out as is the case with the conventional manner of baking a fowl.

A further object of the invention is to provide a novel method of assembling a raw fowl carcass and stuffing within a container having the foregoing characteristics which adapts the assemblage for packaging and distribution through carry-out stores and for displays in refrigerated or frozen food cases, or the like.

Other objects will become apparent from the following specification taken in conjunction with the accompanying drawings, wherein.

Briefly stated the method of the present invention comprises severing a dressed carcass of a raw fowl lengthwise completely through its backbone, spreading apart the two severed regions of the carcass back to flatten out the carcass, laying a bed of stuffing upon the bottom central portion of a pan having a continuous upstanding side wall, and then placing the flattened carcass of the fowl upon the stuffing, breast side up, and thereafter held in a fixed, molded position by the side wall of the pan.

Figure 2:
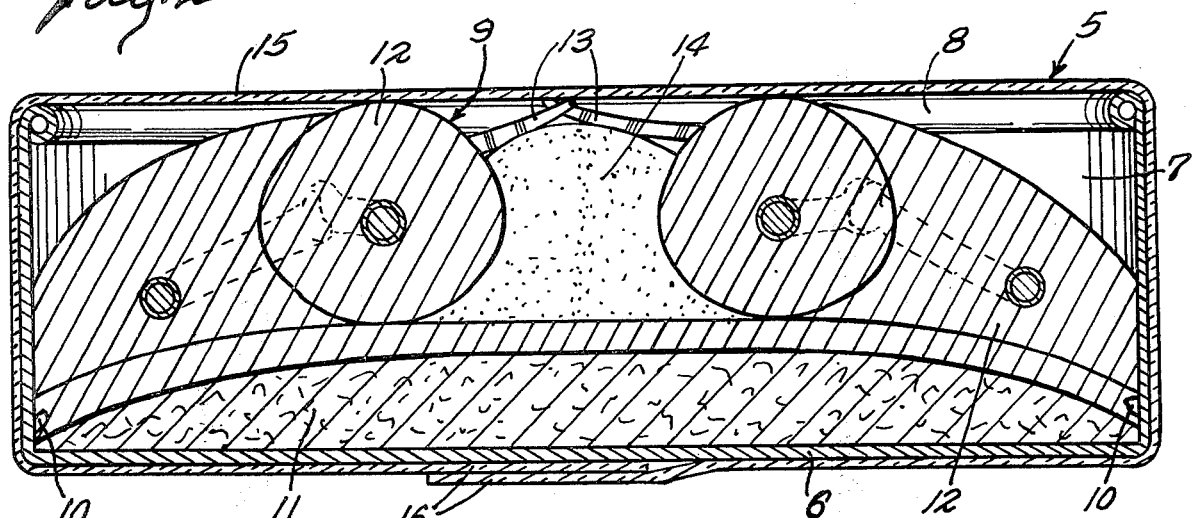
FIG. 2 is a section taken on line 2—2 of FIG. 1.

With reference to the drawings the numeral 5 is a relatively shallow metal pan preferably made of thin aluminum and formed to have a flat bottom wall 6 and an upstanding side wall 7 which terminates at its upper edge in a continuous heavily rolled and preferably inturned flange 8. A dressed raw fowl carcass 9 is severed lengthwise completely through the backbone 10 and the back areas divided thereby are spread apart to place the carcass in the flattened condition best depicted in FIG. 2 of the drawings.

A bed of stuffing 11 is laid upon the bottom 6 of the pan 5 and may consist of a seasoned mixture of bread crumbs, eggs, pork sausage and onions. The flattened dressed raw fowl carcass 9 is laid upon the bed of stuffing 11 and, as illustrated in FIG. 1, the circular wall 7 of the pan is dimensioned to snuggly receive and shape the flattened carcass such that the carcass is confined within the side wall to assume a rounded shape in the pan and which urges the legs 12—12 and wings 13—13 of the fowl carcass into positions across and overlying the breast portion 14 of the fowl and which thereafter maintains the legs and wings in said positions within the pan 5 for baking purposes.

Figure 1:
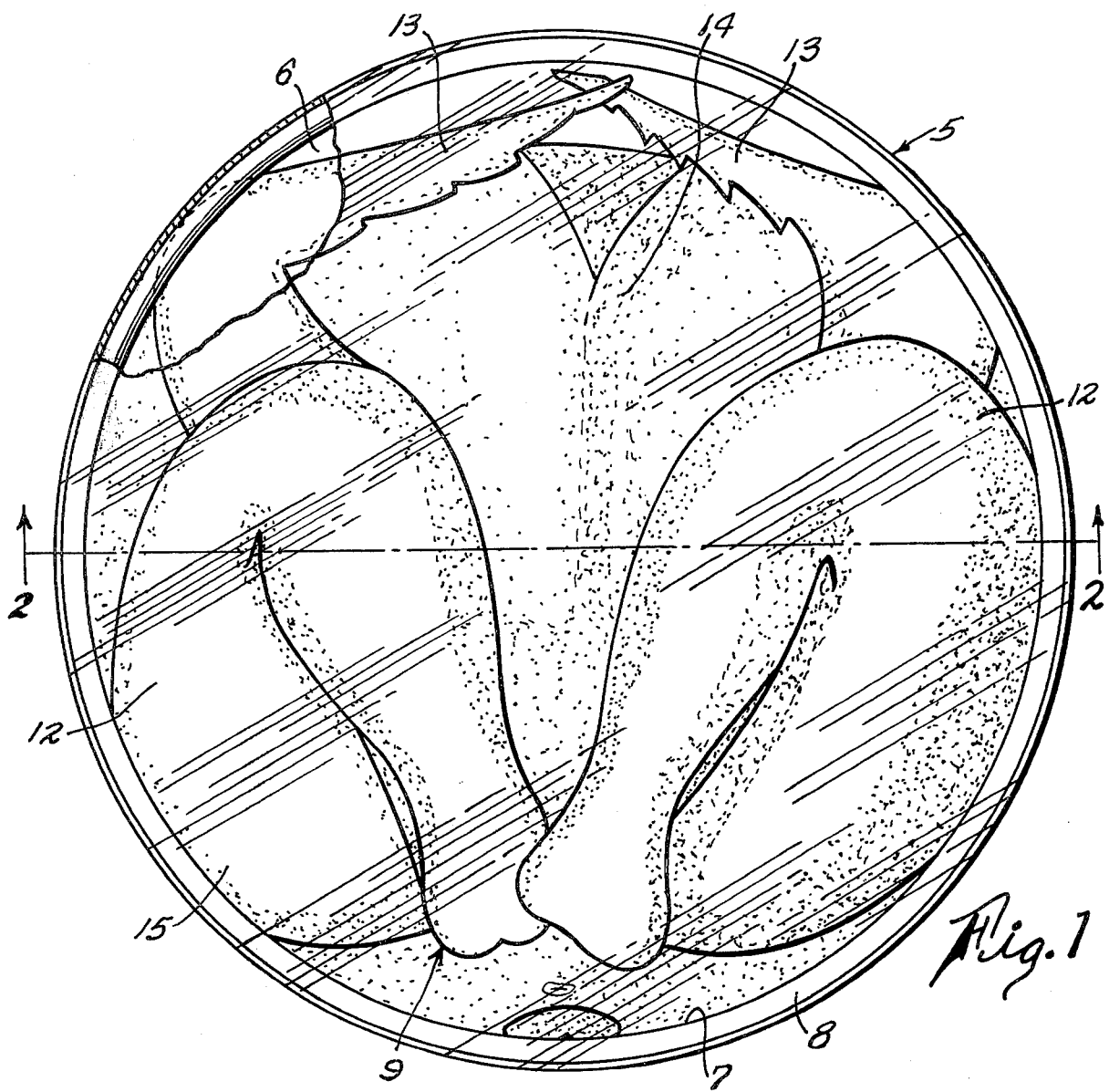
FIG. 1 is a fragmental, top plan view of my raw fowl and stuffing assembled in a baking pan.

In FIG. 1 of the drawings the pan 5 is depicted as having a circular side wall 7 which provides the preferred contour of the flattened carcass when molded in the pan. Other pan forms may be employed having, for example, oval, square or rectangular side walls, it being understood that into whatever shape the carcass is molded within a particular pan, the carcass will be held in a fixed position by the continuous side wall of that pan shape.

A thin transparent, plastic envelope 15 surrounds the pan 5 and its contents and preferably has its ends overlapped at 16 beneath the bottom wall 6 of the pan where said ends are best heat sealed together to form a closed, protective covering for the pan and its contents. The package, so formed, is a unique sales and cooking container which has a good refrigerated or frozen shelf life and which serves as either a sealed-in or open baking pan for the flattened fowl and its stuffing. The cooked contents may also be served from the pan, if desired.

It will therefore be understood that by virtue of my method of preparing a dressed, raw fowl and stuffing for baking there is provided a better cooked and appetizing food product having the many improved characteristics and advantages pointed out hereinbefore.

Having thus described my invention, what is claimed is:

1. The method of preparing a dressed, raw fowl carcass to be baked comprising the steps of laying a bed of stuffing upon the bottom of a pan having an upstanding, continuous side wall around the perimeter of the bottom, severing the fowl carcass lengthwise completely through the backbone area to divide the back into separated portions, spreading apart the back portions to place the carcass in a flattened condition, and laying the flattened carcass, breast side uppermost upon the bed of stuffing and confined within the side wall of the pan with the carcass legs and wings positioned over the breast region of the fowl carcass.

2. The method of preparing a dressed, raw fowl to be baked as set forth in claim 1 including a final step of forming a transparent, envelope around the pan and its contents.

* * * * *